United States Patent [19]
Martin et al.

[11] 4,252,152
[45] Feb. 24, 1981

[54] MOTORIZED CRAWLER FOR GAS MAIN

[76] Inventors: Luther W. Martin, 1221 Julie Dr., Champaign, Ill. 61820; Richard L. Smith, P.O. Box 682, St. Joseph, Ill. 61873

[21] Appl. No.: 66,419

[22] Filed: Aug. 14, 1979

[51] Int. Cl.³ .............................................. F16L 55/18
[52] U.S. Cl. ...................................... 138/97; 405/158
[58] Field of Search ........................ 138/97, 98, 93, 99, 138/90; 405/158, 154, 156

[56] References Cited
U.S. PATENT DOCUMENTS

| | | | |
|---|---|---|---|
| 3,845,789 | 11/1974 | Rohrer | 138/97 |
| 3,940,855 | 3/1976 | Ver Nooy et al. | 405/158 |
| 4,026,329 | 5/1977 | Thompson | 138/97 |
| 4,090,534 | 5/1978 | Martin et al. | 138/97 |

FOREIGN PATENT DOCUMENTS 611994 6/1979 Switzerland ............................... 138/97

Primary Examiner—Lenard A. Footland
Attorney, Agent, or Firm—Jenkins, Coffey, Hyland, Badger & Conrad

[57] ABSTRACT

An electrically powered pipeline crawler for use in conducting an insertion of a smaller-diameter, high-pressure gas main section into a section of lower-pressure, larger-diameter gas main. The pipeline crawler is sealed, so that it can be used to conduct insertion procedures in live gas main sections. Thus, service to customers along a main section upon which such an insertion is being conducted need not be interrupted. The pipeline crawler provides the added flexibility of permitting an insertion to be conducted on a several city block long section, without having to divide the several block long section into smaller sections of one to three blocks in length. Fewer access holes to the main need be dug, so there is less traffic disruption and the like.

24 Claims, 7 Drawing Figures

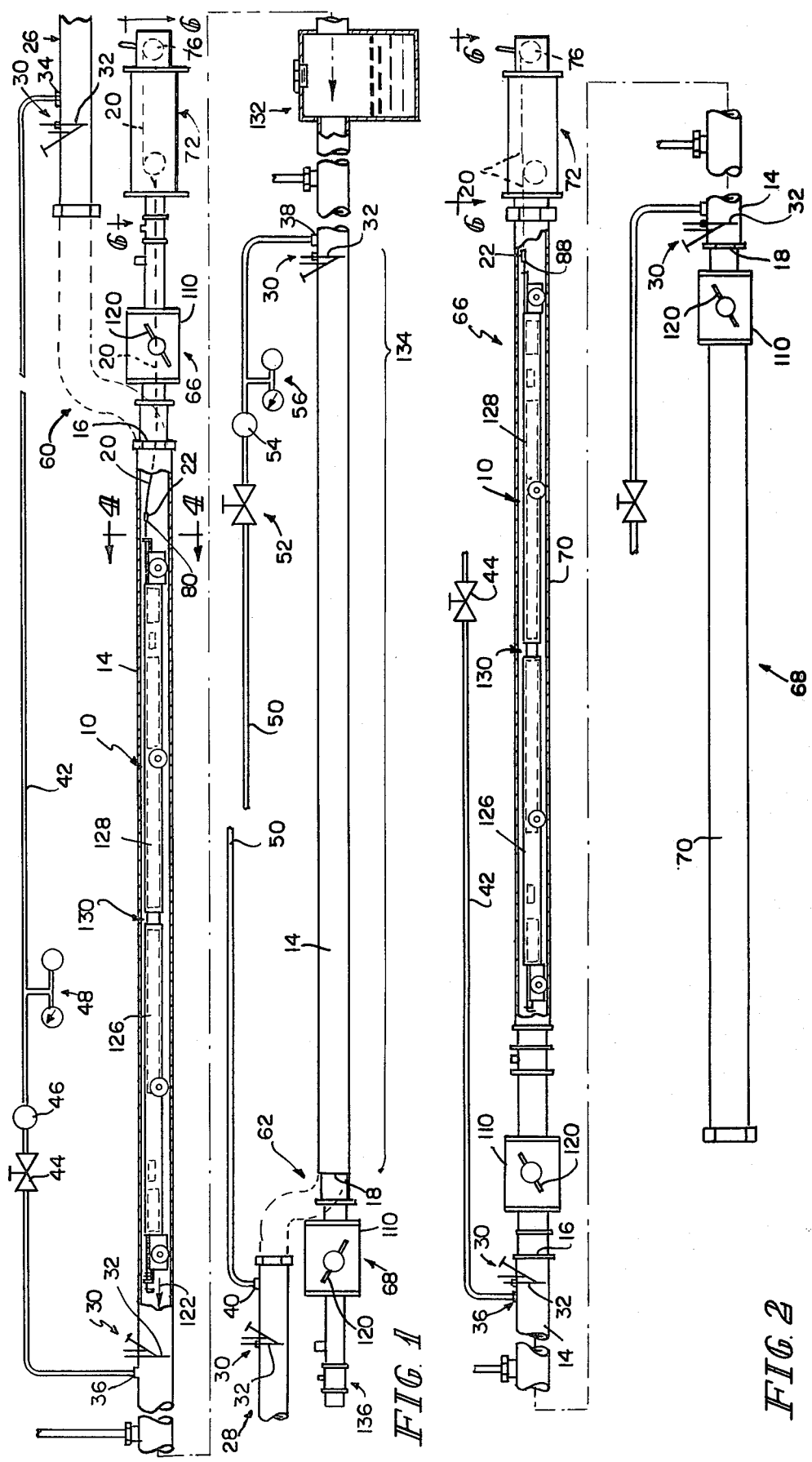

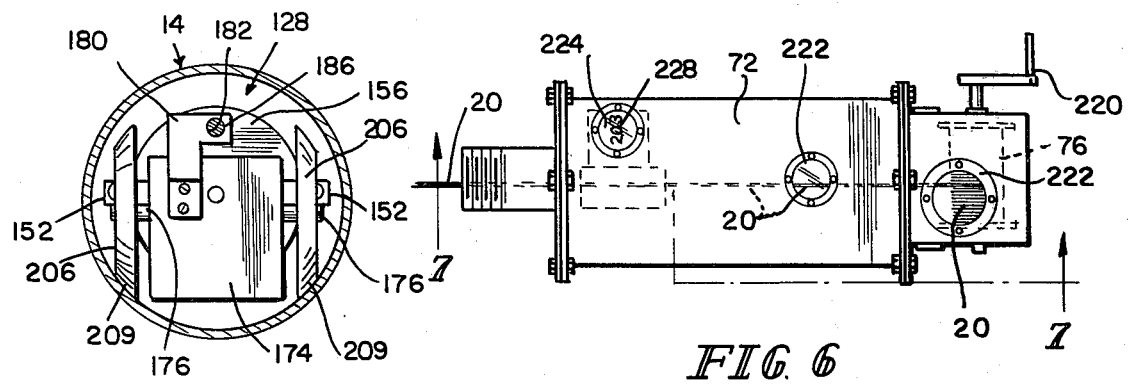
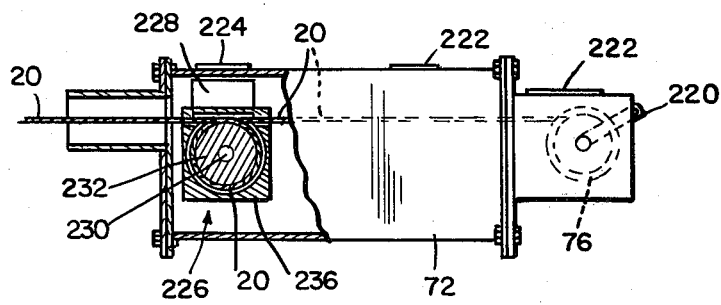
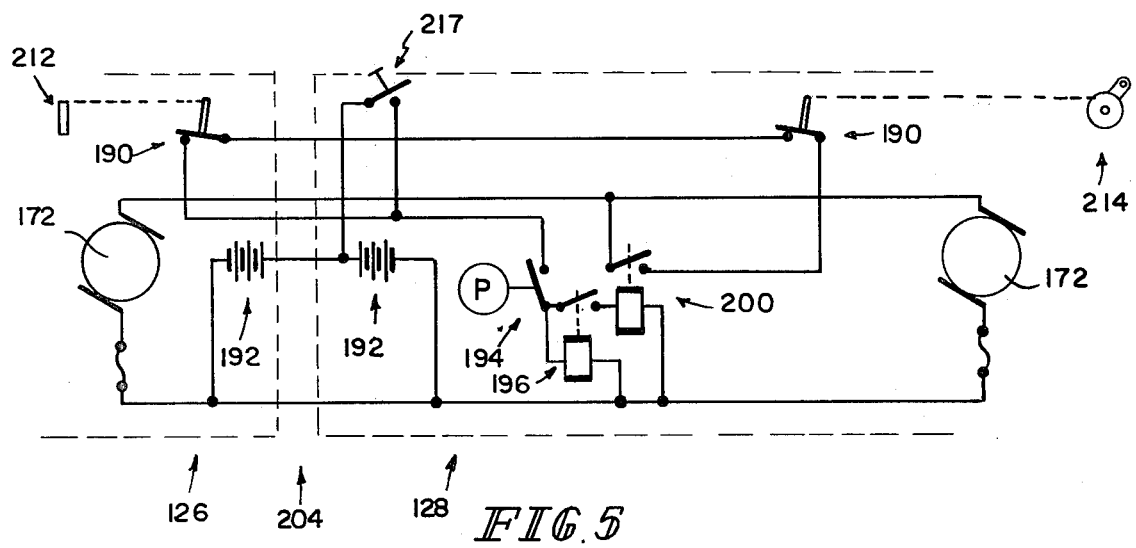

MOTORIZED CRAWLER FOR GAS MAIN

This invention relates to apparatus for the insertion of equipment and materials into tubes, and especially for insertion of a smaller-diameter, higher-pressure gas main into a larger-diameter, relatively lower-pressure gas main while the larger-diameter gas main remains in service under pressure.

More specifically, this invention deals with live gas main insertions of the general type described in U.S. Pat. Nos. 3,845,789 and 4,090,534.

According to the methods described in the above-identified patents, and in our co-pending U.S. patent application Ser. No. 066420, filed on the same date as this application and titled LIVE GAS MAIN INSERTION TOOLS, flexible semirigid fiberglass rods are inserted through seals into a length of live gas main, pushed along the main for a considerable distance, illustratively, 600 feet, and coupled to pull flexible cables through the section of live gas main, and through the seals. The smaller-diameter gas main which is to be inserted into the larger-diameter main is plugged and attached to the flexible cable and then pulled back through the larger-diameter main. All of this insertion technique is conducted while the larger-diameter main is in service under pressure. Interruption of service to customers along the section of main upon which the insertion technique is being conducted is thereby avoided.

It will be appreciated that the above-outlined technique, while superior to prior art techniques for replacing old gas main with new smaller-diameter, higher-pressure, corrosion-resistant gas main, involves three steps. First, the semirigid rod is pushed through the main, then the pulling cable for the smaller-diameter main is pulled through the main, and finally, the smaller-diameter main is pulled through the larger-diameter main. Physical limitations, of course, render it impossible to push the cable along the main. That is the reason why the semirigid rod is used. However, further physical limitations, for example, the weight and flexibility of the semirigid rod, constrain live gas main insertions to lengths of approximately 600 feet (approximately 183 meters) in the prior art, or double that length in our aforementioned co-pending United States patent application. It has been estimated that approximately 65% of all main insertions currently being conducted can be conveniently divided up into lengths of 600 feet (approximately 183 meters). It has further been estimated that approximately 85% of all live main insertions can be conducted upon sections of 1200 feet (approximately 366 meters). Substantially all live main insertions of the type described in the two above-identified U.S. patents can be conducted utilizing the apparatus of the present invention, provided the main doesn't contain any sharp angled bends.

It is an object of the present invention to provide a pipeline crawler mechanism which can operate safely, even within the potentially hazardous environment of a live gas main.

According to the invention, a pipeline crawler includes a sealed housing, means for pressurizing the housing, a motor mounted in the housing, a driving wheel mounted on the housing, means for coupling the motor to the driving wheel, a power source for the motor, and a circuit for coupling the motor and power source. A switch is provided for closing the circuit between the power source and the motor. The switch is mounted in the housing and is sensitive to pressure such that depressurization of the housing opens the circuit to the motor.

Additionally according to the illustrative embodiment, the pipeline crawler includes a second sealed housing and means for coupling the first and second housings in fluid communication with each other such that depressurization of either of the first-mentioned or second housings opens the circuit to the motor.

Further according to the illustrative embodiment, an articulated coupling is provided between the first and second housings. The articulated coupling provides substantially free relative movement between the first-mentioned and second housings about one axis, while prohibiting substantially all relative movement of the housings about a second axis perpendicular to the first.

Additionally according to the illustrative embodiment, the second housing houses a second motor and a second source of power for the second motor and a second circuit for coupling the second motor to the second power source. A second drive wheel is mounted on the second housing and means are provided for coupling the second motor to the second drive wheel. The second circuit includes means for coupling it through the fluid communication coupling to the switch, such that opening of the switch de-energizes both the first-mentioned and second motors substantially simultaneously.

According to the illustrative embodiment, the means for pressurizing the housings also includes means for purging the housings during pressurization such that during pressurization with a non-reactive gas, any reactive gases within the housing are purged.

In the disclosed context, the pipeline is a natural gas pipeline and the crawler is provided for movement in the pipeline while the pipeline is pressurized with natural gas. Pressurization is maintained in the pipeline to prevent interruption of service to customers along the natural gas pipeline. The pipeline crawler is used to carry a flexible cable the length of a pipeline section while maintaining the pressurized environment within the pipeline section. This cable is then utilized to pull a larger-diameter pulling cable back through the pipeline section.

Further according to the illustratibe embodiment, the circuits for coupling the motors and power sources include a second switch and means for selectively operating the second switch. In the illustrative embodiment, one of the housings includes a bumper having a portion for sensing an obstruction in the pipeline. The means for selectively operating the second switch includes means for coupling the bumper to the second switch such that sensing of the obstruction operates the second switch to de-energize the motors. Additionally, the cable being pulled by the pipeline crawler through the pipeline can be used as a control cable. Since the pipeline crawler trails the cable as the crawler moves through the pipeline, means are provided for coupling the cable to the second switch such that a change in the tension of the control wire operates the second switch to de-energize the motor.

The invention may best be understood by referring to the following description and accompanying drawings which illustrate the invention. In the drawings:

FIGS. 1–2 are schematic, diagrammatic and fragmentary side elevational views illustrating insertion techniques utilizing the pipeline crawler of the present invention with certain apparatus and method of the above-identified U.S. patents;

FIG. 4 is a sectional view taken generally along section lines 4—4 of FIG. 1;

FIG. 5 is a schematic diagram of an electric circuit of a pipeline crawler constructed according to the present invention;

FIG. 6 is a sectional view of a detail of the systems illustrated in FIGS. 1-2, and taken generally along section lines 6—6 of FIGS. 1-2; and FIG. 7 is a sectional view of the device illustrated in FIG. 6, taken generally along section lines 7—7 thereof.

Figure 3:
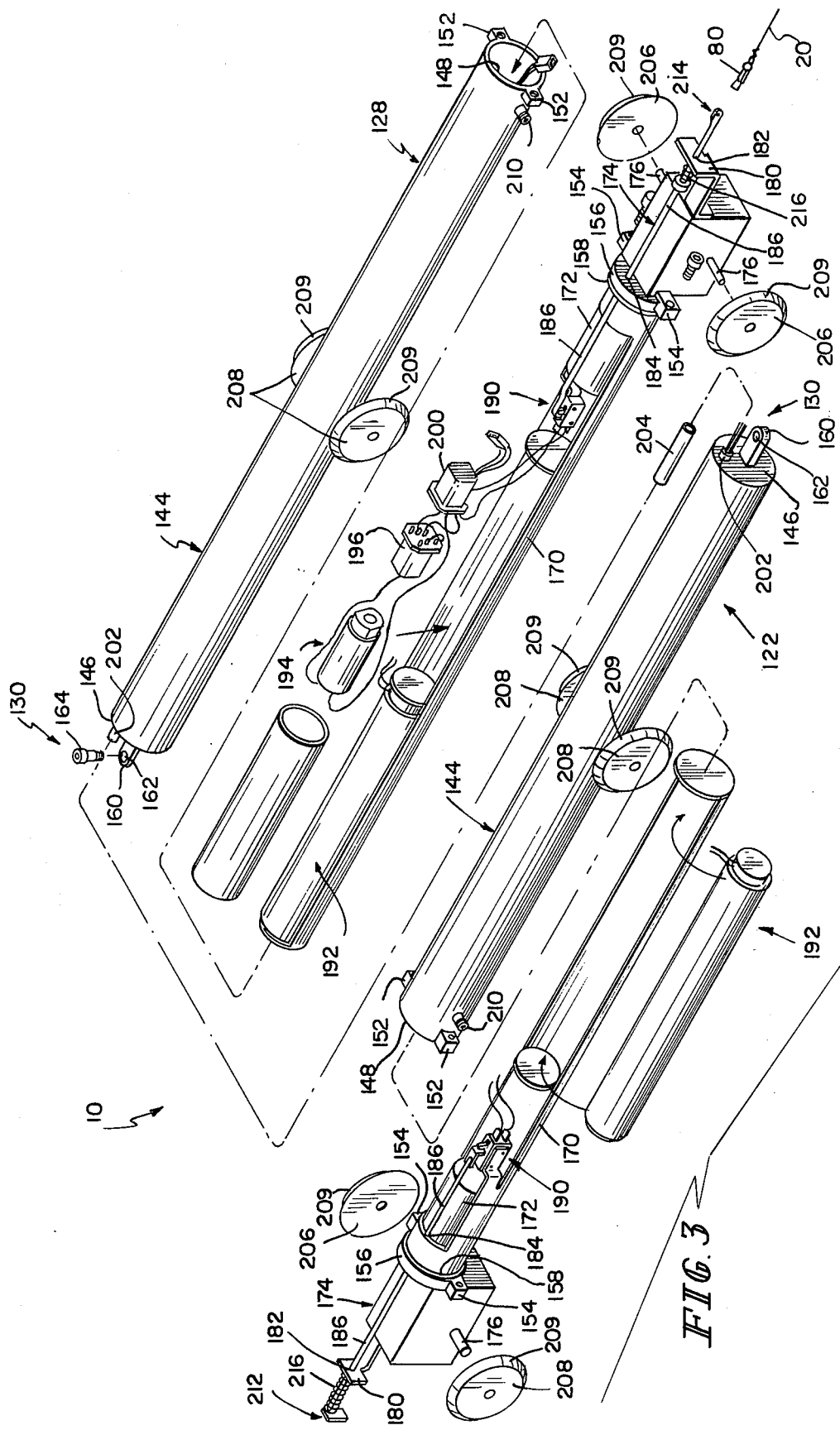
FIG. 3 is an exploded perspective view of the apparatus of the present invention.

Referring now particularly to FIGS. 1-2, two live gas main insertion techniques utilizing the pipeline crawlers of the present invention will be described. In each of these techniques, a pipeline crawler 10 is first sent through a gas main section 14 from an entry end 16 to an exit end 18 carrying a small-diameter pulling cable or "control cable" 20. Once the pipeline crawler 10 has reached the exit end 18 of the gas main section 14, the pipeline crawler 10 itself is removed from the exit end 18 and a larger-diameter pulling cable (not shown) is attached to the end 22 of the control cable 20 and pulled back through the main section 14 to the entry end 16. Finally, the larger-diameter, higher tensile strength pulling cable is used to pull a small-diameter, high-pressure gas main section back through main section 14 from entry end 16 to exit end 18, completing the live main insertion.

The procedure for conducting this insertion is carried out as follows. Main section 14 is isolated from adjacent upstream and downstream gas main sections 26, 28, respectively, (see FIG. 1) by tapping the side walls of main sections 26, 28 and 14 at locations 30, and by inserting bag seals 32 (illustrated diagrammatically). A gas supply bypass tap 34 is then provided in the side wall of upstream gas main section 26 upstream from its terminating bag seal 32. A bypass supply tap 36 is provided in the upstream end of gas main section 14 adjacent the entry end 16 and downstream from section 14 upstream end bag seal 32. Taps 34, 36 are connected by a bypass 42 with a manually-operable shut-off valve 44, a check valve 46, and a recording pressure gauge 48 (FIG. 1). If connections need to be made from gas main section 14 to downstream gas main section 28, such connections are made by installing a bypass 50 between bypass taps 38, 40 on gas main sections 14, 28, respectively. Bypass 50 can include a shut-off valve 52, a check valve 54, and a recording pressure gauge 56, as well as any other suitable instruments.

Next, valves 44, 52 are opened such that gas supplies to the downstream main sections 14, 28 from the upstream main section 26 are provided through bypasses 42, 50 and bag seals 32 are inflated. The connecting sections in regions 60, 62 between gas main sections 26, 14 and 14, 28, respectively, are then removed, exposing the entry end 16 and exit end 18 of gas main section 14. Entry and exit end fittings 66, 68 are then attached to entry and exit ends 16, 18, respectively, in gas-tight sealing relationship.

The configurations of entry and exit end fittings 66, 68 depend to an extent upon the distances from the entry and exit ends 16, 18, respectively, at which the taps 30 for the bag seals 32 in gas main section 14 have been placed. As best illustrated in FIG. 1, if the bag seal 32 at the entry end 16 of section 14 has been placed a distance along main section 14 greater than the length of the pipeline crawler 10 (about 6 feet or 1.83 meters), the length of main section 14 between the upstream bag seal 32 and entry end 16 can be used as a lock for the placement of the pipeline crawler 10 in main section 14. On the other hand, and with reference to FIG. 2, if the upstream and downstream bag seals 32 in gas main section 14 have been inserted near the entry and exit ends 16, 18, respectively, of section 14, the fittings 66, 68 themselves must be provided with throat sections 70 of sufficient length that the pipeline crawler 10 can be placed within the throat sections 70 before the gas main section 14 is opened to begin the insertion procedure.

During the insertion procedure in FIG. 1, the pipeline crawler 10 is inserted into the entry end 16 of main section 14 above the upstream bag seal 32. The entry end fitting 66 is attached and a cable box 72 is attached to entry end fitting 66. A small-diameter pulling or control cable 20 provided on a spool 76 in the cable box 72 is threaded through the coupling of cable box 72 to entry end fitting 66, through the entry end fitting 66, and is attached, illustratively, by a snap swivel 80 to pipeline crawler 10. The entry end fitting 66 includes a gate box 110 of the general type described in U.S. Pat. No. 4,090,534. Gate box 110 includes a pair of gates or rams which are actuable by hand manipulation of handles 120 to move into close sealing relationship around a larger diameter cable. The larger diameter cable is the cable which will be pulled through main section 14 by pulling cable 20 after pipeline crawler 10 has reached the exit end 18 of main section 14.

The bag seals 32 in main section 14 are then deflated and tension on pulling cable 20 is relieved to start the pipeline crawler 10 in a manner which will be described. Pipeline crawler 10 begins its journey down gas main section 14 in the direction of arrow 122 (FIG. 1) toward exit end 18. The pipeline crawler 10 is of considerable length, illustratively 6 feet (1.83 meters) and is divided into a forward section 126 and a rearward section 128 joined at an articulated joint 130. Articulated joint 130 provides substantial flexibility between sections 126, 128 about a vertical axis, but little or no flexibility about a horizontal axis perpendicular to the axis of the gas main section 14. The substantial flexibility about a vertical axis permits the pipeline crawler 10 to move with ease through a main section 14 which is not laid out perfectly straight. The very limited flexibility about a horizontal axis perpendicular to the axis of main section 14, while permitting the crawler 10 to pass through slight "dips", "humps", and inclined regions of main section 14, prevents the crawler 10 from being hampered in its movement through gas main section 14 by the occasional drip pot 132 (FIG. 1) which it may encounter. Such drip pots 132 are common in old gas delivery facilities, because the manufactured gas which was at one time provided by such facilities contained a considerable amount of moisture which would condense in the delivery facilities and run toward low points. The drip pots 132 were provided at such low points to collect condensation and prevent such condensation from blocking the delivery facility. Typically, such drip pots will have diameters in the range of 18 inches to 24 inches (0.46 meters to 0.61 meters).

After the pipeline crawler 10 has passed the downstream bag seal 32 adjacent exit end 18, downstream bag seal 32 is inflated around the small-diameter pulling cable 20, isolating the downstream section 134 of gas main section 14 within which the crawler 10 is parked from the gas supply. The exit end fitting 68 is removed and pipeline crawler 10 is pulled from section 134. The larger-diameter pulling cable (not shown) which will be used in the final stages of insertion of the smaller-diameter main section into main section 14 in accordance with U.S. Pat. No. 4,090,534 is threaded through a nipple fitting 136 provided with grease chambers of the type described in U.S. Pat. No. 4,090,534, through the gate box 110 of exit end fitting 68, and is attached to the end 22 of pulling cable 20. Exit end fitting 68, with nipple fitting 136 attached, is remounted on exit end 18. The larger diameter pulling cable is then pulled back through gas main section 14 to entry end 16, while a greased seal is maintained between fitting 136 and the larger-diameter cable. The handles 120 at the entry end fitting 16 gate box 110 are manipulated to close the gates around this larger-diameter cable, again sealing main section 14. The cable box 72 and associated fittings at entry end 16 can be removed and replaced by a fitting (not shown) having an inside diameter equal to the outside diameter of the main section to be inserted. Such a fitting will also have a grease chamber, so that a grease seal may be maintained during insertion of the smaller-diameter main section.

The remainder of the insertion proceeds generally as outlined in U.S. Pat. No. 4,090,534. It is important to recognize that this entire procedure is conducted without interruption of service to customers whose service lines 138 tap into gas main section 14.

Turning now to the construction of the pipeline crawler 10 itself, and with reference to FIGS. 3-5, each of the forward and rearward sections 126, 128 of crawler 10 comprises an elongated tube 144 substantially closed at one end 146 and open at the other end 148. The open ends 148 are provided with attachment flanges or ears 152 which align with attachment flanges 154 on sealing bulkheads 156. The bulkheads 156 are provided with O-rings 158 to seal the interiors of tubes 144 after insertion of all of the components into the tubes.

The closed end 146 of each tube 144 is provided with a tongue 160. The tongues 160 have mating passageways 162 which receive a pivot pin 164 to form the articulated joint 130. The articulated joint 130 provides substantially free movement between the forward and rearward sections 126, 128 of pipeline crawler 10 about the axis of pivot pin 164, while substantially preventing any motion about an axis perpendicular to the axis of pivot pin 164 and to the axis of gas main section 14.

The components of each of the forward and rearward sections 126, 128 are mounted in a trough-like support 170. The components include an electric motor 172 mounted on the inside of bulkhead 156. The shaft of the electric motor 172 projects through an aperture in the bulkhead 156 into a combination transmission and axle housing 174. The transmission and axle housing 174 is sealed to the bulkhead 156. Drive axles 176 project from housing 174 on its opposite sides. The axles 176 project outwardly through openings provided with packings which maintain the sealed integrity of the interiors of the forward and rearward sections 126, 128. Housing 174 includes a bracket 180 providing an aperture 182. An aperture 184 aligned with aperture 182 is provided in the bulkhead 156. A sealing packing is mounted in the aperture 184 and a motor control rod 186 extends through the packing in aperture 184 from the interior of the tube 144 to its exterior, and through the aperture 182 in the bracket 180. A motor control switch 190 is mounted in the support 170 within the tube 144. The motor control rod 186 engages the switch 190 to operate it in a manner which will be described.

Each of supports 170 also include a power source for its respective motor 172. Illustratively, the power sources are battery packs 192. One of the supports 170, illustratively the one associated with the rearward section 128 of pipeline crawler 10, also includes a pressure sensitive electrical switch 194, a REED-RELAY 196, and a relay 200.

The closed end 146 of each of tubes 144 is provided with a coupler nipple 202. A flexible tube 204 is attached, e.g., by hose clamps (not shown) to the coupler nipples 202 to couple the interiors of tubes 144 in fluid communication. Necessary electrical conductors which couple the motors 172, switches 190, 194, REED-RELAY 196 and relay 200 in the circuits of both of the sections 126, 128 also extend through the tube 204.

Drive wheels 206 are mounted on the drive axles 176 associated with each transmission-axle assembly 174. Additional bosses are provided on the side wall of each elongated tube 144. These bosses provide axles which mount additional support wheels 208 for each of the forward and rearward sections 126, 128.

Directly behind one of the flanges 152 associated with each tube 144 is a valve 210. Valves 210 are of a type which can be manually opened. One of the valves 210 is coupled to a source of a non-reactive gas, e.g., nitrogen, under pressure which fills the tubes 144 with a nitrogen atmosphere. If the tubes are filled from one end and both valves are opened, other gases are purged from the interiors of the tubes 144 by filling the tubes from the valve 210 at one end with nitrogen. Such nitrogen filling and purging puts all of the components within the tubes 144 in a nitrogen atmosphere, which is incapable of sustaining combustion. This is important, since the electric motors 172 are going to be operating within a gas main section 14 which is pressurized with natural gas. Additionally, pressurization of the tube 144 interiors closes the pressure sensitive electrical switch 194 to place the motor 172 circuits in such a condition that the motors 172 can be energized.

A bumper 212 is mounted at the outer end of the motor control rod 186 associated with the forward section 126 of pipeline crawler 10. A connector 214 for the snap swivel 80 is mounted at the rearward end of the motor control rod 186 associated with the rearward section 128 of pipeline crawler 10. Motor control switches 190 are positioned such that tension on the pulling cable 74 is transmitted through swivel 80, connector 214, and its associated motor control rod 186 to open the motor 172 circuits, preventing the pipeline crawler 10 from moving. The motor control switch 190 associated with bumper 212 is positioned so that the switch 190 is closed until the bumper 212 encounters an obstruction and its motor control rod 186 is pushed rearwardly. Both of the motor control rods 186 are biased into motor control switch 190 closing positions by helical compression springs 216. An additional switch 217 is provided on the pipeline crawler 10. A workman closes this switch prior to insertion of the crawler 10 into the main to condition the crawler for operation.

As best illustrated in FIG. 4, the wheel 206, 208 peripheries 209 are convexly or spherically contoured to conform to the inner side wall of gas main section 14.

Turning now to FIGS. 6-7, the cable box 72 includes the spool 76 upon which is wound a substantial quantity of the small-diameter pulling cable 20. Spool 76 is mounted in box 72 for rotation by a handle 220 in the take-up direction. In the pay-out direction (corresponding to crawler 20 moving through gas main section 14 from the entry end 16 to the exit end 18 in FIGS. 1–2), the spool 76 is free-wheeling. The cable box 72 includes viewing ports 222 through which the cable 74 condition can be observed. An observer can determine, for example, whether the cable 74 is slack or taut, and whether the cable is being paid out from spool 76. An additional port 224 is provided in the cable box 72. An odometer 226 is mounted beneath the port 224 to be viewed therethrough. The odometer includes a counter 228 attached to the shaft 230 of a wheel 232 about which the cable 20 extends. A cover 236 surrounds the wheel 232 and includes openings through which cable 20 passes into and from the cover 236. The cover 236 insures that the cable 74 does not slip from the wheel 232 when the tension on cable 74 is reduced. By watching the counter 228 of the odometer, it can be determined how far through the gas main section 14 the pipeline crawler 10 has travelled. This can be of considerable assistance, for example, when an obstruction is encountered by the pipeline crawler 10. The odometer 226 is also of assistance in determining whether the pipeline crawler 10 is about to reach its destination, end 18 of main section 14.

In an illustrative pipeline crawler 10, the motors 172 were Model Rectifier Corporation 2,000 r.p.m., six volt motors. The transmission 174 had a gear ratio of 20:1, providing a speed of approximately 140 feet per minute. The gear drive was a Winfred Berg, Inc. drive. Relay 200 was a Potter & Brumfield six volt, ten ampere relay with a 100 milliamp holding coil. The batteries 192 were Elpower Corporation Solid-Gel ® six volt batteries. REED-RELAY 196 is a six volt, 100 milliamp with a ten milliamp holding coil—this second relay was necessary as pressure switch is rated for 50 milliamps.

What is claimed is:

1. A pipeline crawler comprising a sealed first housing, means for pressurizing the first housing, a motor mounted in the first housing, a driving wheel mounted on the first housing, means for coupling the motor to the driving wheel, a source of power for the motor, a circuit for coupling the motor and power source, and a switch for closing the circuit between the power source and the motor, the switch being mounted in the first housing and sensitive to pressure such that depressurization of the first housing opens the circuit to the motor.

2. The apparatus of claim 1 and further comprising a sealed second housing, and means for coupling the first and second housings in fluid communication with each other, such that depressurization of the second housing also opens the circuit to the motor.

3. The apparatus of claim 2 wherein the second housing houses a second motor, a second source of power for the second motor, and a second circuit for coupling the second motor to the second source of power, a second driving wheel and means for coupling the second motor to the second driving wheel.

4. The apparatus of claim 3 wherein the second circuit includes means for coupling it through the fluid communication means to the switch such that opening of the switch de-energizes the first and second motors substantially simultaneously.

5. The apparatus of claim 2 and further comprising means for providing an articulated coupling between the first and second housings.

6. The apparatus of claim 5 wherein the articulated coupling means provides for substantially free relative movement of the first and second housings about one axis while prohibiting substantially all relative movement of the housings about a second axis perpendicular to the first.

7. The apparatus of claim 2 wherein the housings are elongated, tubular and generally cylindrical in section transverse to their axes and the longitudinal axis of the pipeline for easy insertion into, and movement along, the pipeline.

8. The apparatus of claim 1 wherein the means for pressurizing the first housing further comprises means for purging the first housing during pressurization such that during pressurization with a non-reactive gas, reactive gases are purged from the housing interior.

9. The apparatus of claim 8 wherein the pipeline is a natural gas pipeline and the crawler is provided for movement in the pipeline while the pipeline is pressurized with natural gas.

10. The apparatus of claim 1 and further comprising a second drive wheel, the means for coupling the motor and drive wheels comprising a transmission and axle combination drive by the motor, the axle mounting the drive wheels, and further comprising additional support wheels.

11. The apparatus of claim 1 wherein the circuit for coupling the motor and power source includes a second switch and means for selectively operating the second switch.

12. The apparatus of claim 11 wherein the first housing further comprises a bumper including a portion for sensing an obstruction in the pipeline, and the means for selectively operating the second switch includes means for coupling the bumper to the second switch such that sensing of an obstruction operates the second switch to de-energize the motor.

13. The apparatus of claim 11 and further comprising a control wire, the pipeline crawler trailing the control wire as the crawler moves through the pipeline and means for coupling the control wire to the second switch such that a change in the tension of the control wire operates the second switch to de-energize the motor.

14. A pipeline crawler comprising two housings, a motor housed in one of the housings, a source of power for the motor housed in one of the housings, each housing provided with wheels, a drive wheel provided on one of the housings, means for coupling the motor to the drive wheel, and means for coupling the housings together for articulation about an axis.

15. The apparatus of claim 14 wherein the means for coupling the housings together for articulation about an axis prevents articulation about another axis perpendicular to said axis.

16. The apparatus of claim 14 and further including means for coupling the interiors of the housings to one another.

17. The apparatus of claim 16 wherein the interiors of said housings are sealed, each said housing including means for pressurizing its interior.

18. The apparatus of claim 17 wherein the means for pressurizing each housing includes means for simultaneously purging the housing of fluids contained therein prior to pressurization.

19. The apparatus of claim 17 wherein the means for coupling the housing interiors together includes means for coupling the interiors of said housings together in fluid communication.

20. The apparatus of claim 19 and further comprising a switch and a circuit for coupling the motor to the power source, the switch being actuable to close and open the circuit to energize and de-energize the motor.

21. The apparatus of claim 20 wherein the switch is mounted in one of the housings and is pressure sensitive, depressurization of the interior of said housing opening the switch to de-energize the motor.

22. The apparatus of claim 21 and further comprising a second switch, means for coupling the second switch in the circuit coupling the motor and power source, and means for remotely controlling the second switch.

23. The apparatus of claim 22 and further comprising a bumper mounted on the housing to contact obstructions in the pipeline, the means for remotely controlling the second switch including means for coupling the bumper to the second switch, contact with an obstruction causing the second switch to open.

24. The apparatus of claim 22 and further comprising a control wire trailed by the pipeline crawler as it moves through the pipeline, the means for remotely controlling the second switch including means for coupling the control wire to the second switch, tension on the control wire causing the second switch to open.

* * * * *

UNITED STATES PATENT AND TRADEMARK OFFICE
CERTIFICATE OF CORRECTION

PATENT NO. : 4,252,152

DATED : February 24, 1981

INVENTOR(S) : Luther W. Martin and Richard L. Smith

It is certified that error appears in the above-identified patent and that said Letters Patent are hereby corrected as shown below:

Column 4, line 13, "beginthe" should be -- begin the --.

Column 5, line 27, after "entire" and before "procedure", insert -- insertion --.

Column 8, line 4, (Claim 6, line 4), "oneaxis" should be -- one axis --; same column, line 24, (Claim 10, line 4), "drive" should be -- driven --.

Signed and Sealed this

Thirtieth Day of June 1981

[SEAL]

Attest:

RENE D. TEGTMEYER

Attesting Officer

Acting Commissioner of Patents and Trademarks